United States Patent Office 3,711,456
Patented Jan. 16, 1973

---

3,711,456
PROCESS FOR THE PREPARATION OF ETHYLENE-CARBOXYLIC ACID POLYMERS HAVING IMPROVED OPTICAL PROPERTIES
Ronald E. Gilbert, Shawnee Mission, Donald R. Jamieson, Merriam, and Bert H. Clampitt, Overland Park, Kans., assignors to Gulf Research & Development Company, Pittsburgh, Pa.
No Drawing. Filed Apr. 22, 1971, Ser. No. 136,606
Int. Cl. C08f 15/04, 15/14
U.S. Cl. 260—88.1 R  5 Claims

ABSTRACT OF THE DISCLOSURE

Ethylene-carboxylic acid polymers having substantially improved optical properties are obtained by intimately contacting a normally solid random ethylene-carboxylic acid polymer with a polyethylene solvent at an elevated temperature, and thereafter separating the solvent from the solid ethylene polymer.

BACKGROUND OF THE INVENTION

Ethylene-acrylic acid polymers have been found to be valuable in the preparation of laminated glass structures which are in turn employed as safety glass in automobiles and in the construction of buildings. It will be appreciated that in the construction of such laminated glass structures that the ethylene-acrylic acid polymer employed as an inner layer between two glass laminae must have excellent strength, adhesive and optical characteristics. Resins which are employed in the preparation of glass laminated structures must be capable of being inner laid readily with the glass, must exhibit high impact strength and have good adhesion to the glass over a wide temperature range. Additionally, the laminated glass structures employed as safety glass must possess good visible transparency. For example, the optical characteristic identified as haze—which measures the frosty appearance of transmitted light through the polymer—must be very low.

Ethylene-carboxylic acid polymers particularly suitable in the preparation of laminated glass structures are those normally solid random copolymers of ethylene and acrylic acid containing from 0.04 to 0.5 mol of acrylic acid per mol of contained ethylene. These ethylene-acrylic acid polymers can be prepared by processes such as described in U.S. Pat. 3,485,785, U.S. Pat. 3,520,861, and U.S. 3,674,761. Laminated glass structures prepared from such ethylene-acrylic acid copolymers normally have a haze of 3 to 24 percent, as measured by the Gardner hazemeter. This is contrasted to an acceptable haze reading of less than 2 percent for safety glass which is to be employed in the fabrication of automobiles.

Ethylene-carboxylic acid polymers have also found wide application in the commercial packaging field. Such ethylene polymers can be prepared by conventional extrusion and blown film processes to produce films which are employed as packaging films or which can be employed in the preparation of laminated film structures. As in the case of the glass laminated structures, excellent ethylene polymer optical characteristics are essential in the commerical packaging field.

Accordingly, an object of the invention is to provide an ethylene-carboxylic acid polymer having improved optical properties.

Another object of the invention is to provide an ethylene-carboxylic acid film having improved optical characteristics.

Yet another object of the invention is to provide a process for obtaining an ethylene-carboxylic acid polymer having improved optical characteristics.

An additional object of the invention is to provide laminated structures containing an ethylene-carboxylic acid polymer layer having substantially improved haze.

Other objects, advantages and features of the invention will be readily apparent to those skilled in the art from the following description and appended claims.

SUMMARY OF THE INVENTION

By the invention an ethylene-carboxylic acid polymer having substantially improved haze is prepared by intimately contacting a normally solid, random ethylene-carboxylic acid polymer with a polyethylene solvent at an elevated temperature and thereafter separating the polyethylene solvent from the ethylene-carboxylic acid polymer.

DESCRIPTION OF THE INVENTION

The invention is directed to the preparation of ethylene carboxylic acid polymers having improved optical characteristics and will generally comprise those ethylene polymers containing from about 10 to 50, preferably 15 to 35, weight percent of the carboxylic acid monomer. The carboxylic acid monomer comprises an $\alpha,\beta$-ethylenically unsaturated carboxylic acid having preferably from 3 to 10 carbon atoms per molecule. Examples of such monomers are acrylic acid, methacrylic acid, ethacrylic acid, itaconic acid, maleic acid and fumaric acid. In addition to the ethylene and carboxylic acid monomers, the ethylene-carboxylic acid polymers of the invention may contain minor portions of one or more additional monomers, such as vinyl acetate, esters of the above-named acids, salts of the above-named acids, and amides such as acrylamide and methacrylamide.

In the practice of the invention the ethylene-carboxylic acid polymer is intimately contacted with a solvent capable of dissolving polyethylene. The term "polyethylene solvent," as hereinafter employed, refers to those solvents capable of dissolving polyethylene but which will not dissolve more than 30 weight percent of the ethylene-carboxylic acid polymer treated under conditions of extraction as hereafter described. Polyethylene solvents, which have been found to be particularly effective in the practice of the invention include xylene, benzene, toluene, ethylbenzene, carbon tetrachloride, tetrachloroethylene, chlorobenzene, o-dichlorobenzene, and generally hydrocarbons having a boiling point above 80° C., and mixtures of such solvents. Although not critical to the invention, the ratio of solvent to ethylene polymer employed in the practice of the invention will normally be at least 10 to 1 on a weight basis.

The ethylene polymer is contacted with the solvent at an elevated temperature of at least 50° C. and preferably at least 80° C., measured at atmospheric pressure. The temperature employed in the contacting step is below the boiling point of the solvent. When xylene is employed as the polyethylene solvent, a contacting temperature of about 100° C. has been found to be particularly effective in the practice of the invention.

Upon contacting the ethylene polymer with the polyethylene solvent in the extraction step, the ethylene polymer is caused to swell or expand. The residence time required in the contacting step is related to the temperature of the solvent. Normally, when operating at an elevated temperature of at least 50° C., contact between the polyethylene solvent and the ethylene polymer will be maintained for a period of time of at least two minutes.

The particular extraction method employed in effecting contact between the ethylene-carboxylic acid polymer and the polyethylene solvent is not critical to the invention. For example, the ethylene-carboxylic acid polymer can be immersed in the polyethylene solvent. Another suitable method of contacting the ethylene-carboxylic acid polymer with the polyethylene solvent is to pass the solid ethylene polymer downwardly through a vessel containing the polyethylene solvent. Yet another method for effecting contact is to pass the solid ethylene-carboxylic acid polymer downwardly through a vessel in countercurrent flow to upward flowing polyethylene solvent. Preferably, agitation of the solvent-polymer mixture is effected during the extraction step.

The polyethylene solvent can then be separated from the solid ethylene-carboxylic acid polymer by conventional means. For example, in the case where the ethylene-carboxylic acid polymer is immersed in the polyethylene solvent, the polyethylene solvent can be decanted from the vessel containing the ethylene-carboxylic acid polymer. The ethylene-carboxylic acid polymer can be separated from the polyethylene solvent by conventional filtration means and the filtered polymer product air-dried to produce an ethylene-carboxylic acid polymer product having substantially improved optical characteristics.

The mechanism whereby the optical characteristics of the ethylene-carboxylic acid polymer are improved is apparently based upon the selective extraction of the low molecular weight crystalline, low acrylic acid portion of the ethylene-carboxylic acid polymer. Infrared and solution viscosity analyses of the extracted polymer portion indicate that the extracted material is a low molecular weight polymer fraction containing a low concentration of acrylic acid.

It is within the scope of the invention to employ multiple extraction stages to produce an ethylene-carboxylic acid polymer having improved optical characteristics. As illustrative of this second embodiment, upon separating the polyethylene solvent from the ethylene polymer in the first extraction step, a second portion of the polyethylene solvent is brought into intimate contact with the ethylene polymer. Following separating of this second portion from the ethylene-carboxylic acid polymer, the ethylene polymer product is filtered and air-dried.

Separation of the polyethylene solvent from the ethylene-carboxylic acid polymer can be accelerated by employment of a drying agent, such as acetone. In the practice of this embodiment, acetone is admixed with the ethylene-carboxylic acid polymer following separation of the ethylene-carboxylic acid from the bulk of the polyethylene solvent. After admixing the acetone with the ethylene polymer, the ethylene-carboxylic acid polymer can be separated therefrom by filtration and air-dried to provide an ethylene-carboxylic acid polymer which when cast into a film by a conventional process has substantially superior haze characteristics when compared with the haze characteristics of ethylene-carboxylic acid polymer films prepared by conventional processes.

The term "haze" refers to that percentage of transmitted light which in passing through the laminated specimen deviates from the incident beam by forward scattering. Only light flux deviating more than 2.5 degrees from the average is considered to be haze, as measured by employing American Society for Testing and Materials (ASTM) test method D–1003–61.

As previously indicated, haze readings of less than 2 percent are required for laminated safety glass structures employed in the fabrication of automobiles. In addition to meeting this standard as set forth by ASTM D–1003–61, safety glass structures employed in the fabrication of automobiles must pass a visual haze inspection for which no generally acceptable standard test procedure exists. This visual test is to transmit a beam of light from a high intensity lamp such as a photographic projection lamp through the glass laminate. The glass laminate is rejected if a blue tinted haze is observed. The glass laminate is accepted if clear and free of the blue tinted haze.

The ethylene-carboxylic acid polymers, and particularly the ethylene-acrylic acid polymers, of this invention are particularly adaptable in the preparation of laminated glass structures which are to be employed as safety glass in automobiles and in the construction of buildings. The laminated glass structure can be prepared by bonding together at least two glass laminae with the ethylene-acrylic acid polymer, thereby obtaining a laminated glass structure with an ethylene-acrylic acid polymer film layer as the inner layer.

A film layer of the product ethylene-carboxylic acid polymer can be obtained by laying down an aqueous dispersion of the polymer on a substrate such as glass and evaporating the water therefrom or by melt extrusion of the ethylene-carboxylic acid polymer employing procedures known to the art. Alternatively, an organic solvent solution of the ethylene-carboxylic acid polymer can be laid down on a surface and the solvent evaporated therefrom.

The laminated glass structures can be prepared, for example, by placing films or tapes of the ethylene-carboxylic acid polymer between two glass laminae before the laminae are subjected to heat and pressure. The laminates thus prepared are firmly bonded together and ordinarily cannot be separated without destroying at least one of the laminae. A film layer can also be obtained by distributing solid particles of the ethylene-carboxylic acid polymer on one lamina, placing a second lamina on top thereof, and finally heating the laminated structure under pressure.

The laminated glass structures containing the ethylene-carboxylic acid polymer inner layer have surprisingly high impact strength, are more resistant to temperature change than glass laminae conventionally employed as safety glass in automobiles, for example, and, in addition, will by reason of this invention have optical characteristics substantially superior to those laminated glass structures using ethylene-acrylic acid polymer resins and other synthetic resins such as polyvinyl butyral as the inner layer.

In the preparation of safety glass laminates, the invention has been found to be particularly effective in the production of an inner layer having greatly improved haze when the ethylene-carboxylic acid polymer treated is obtained by the thermal decomposition process described in U.S. 3,674,761. Preferably such ethylene polymers so prepared comprise ethylene-acrylic or methacrylic acid polymers containing from 17 to 25 weight percent of the acid monomer and having a melt index in the range of 0.1 to 20. The copending application describes a process whereby a copolymer comprising ethylene and an isopropyl ester of acrylic or methacrylic acid and is treated to the ester decomposition temperature in the presence of a controlled concentration of water vapor or ammonia, and an ethylene and acrylic or methacrylic acid polymer having a controlled melt index is recovered therefrom.

In addition to preparation of glass laminated structures, the ethylene carboxylic acid polymer products of the invention are useful in the preparation of thermoplastic film laminated structures wherein at least one of the thermoplastic film layers is the ethylene-carboxylic acid polymer of the invention. The ethylene-carboxylic acid polymer can also be extruded in a thin film and the film deposited upon a substrate such as a metal foil or sheet. The substrate can also be such non-metallic materials as wood, paper, paperboard, corrugated paper, leather, fabric and the like.

The following examples are presented to illustrate objects and advantages of the invention. However, it is not intended to limit the invention of the specific embodiment described therein.

Example I

A random ethylene-isopropyl acrylate copolymer having the characteristics set forth in the following Table I, was thermally cracked according to the process described in U.S. 3,674,761 to provide the ethylene-acrylic acid copolymer of Table I:

TABLE I

|  | Ethylene-isopropyl acrylate copolymer feed | Ethylene-acrylic acid polymer product |
|---|---|---|
| Isopropyl acrylate, weight percent | 28.9 |  |
| Acrylate acid content, weight percent |  | 20.4 |
| Melt index [1] | 0.65 | 18.4 |
| Inherent viscosity [2] | 1.147 | 0.544 |
| Tensile strenght, p.s.i.[3] | 1,969 | 4,520 |
| Elongation, percent [3] | 1,660 | 911 |
| Tensile impact, ft. lbs./sq. in | [4] 250 | 256 |
| Haze, percent [5] | 6.6 | 1.1 |
| Visual haze [6] | [7] | [8] |

[1] ASTM D-1238-62T.
[2] Determined by using a 1% solution of polymer and lauryl alcohol and measuring viscosity at 100° C. using a Saybolt viscometer.
[3] ASTM D-1708-66.
[4] ASTM D-1822-61T.
[5] ASTM D-1003-61 (Gardner hazemeter), using a laminated glass structure comprising two 0.125 inch polished plate glass laminae bonded with a 30-mil polymer inner layer.
[6] Visual observation in a beam of a high intensity projection lamp.
[7] Cloudy, bluish haze.
[8] Clear, bluish haze.

From the results shown in Table I, it is apparent that the haze characteristics of the laminated structure containing the ethylene-acrylic acid polymer as an inner layer are inadequate for the preparation of automobile safety glass in that a bluish haze is observed when passing the beam of a high intensity lamp through the laminated structure.

The ethylene-acrylic acid polymer of Table I was immersed in xylene at 130° C. for a period of 8 minutes. Ten weight percent of the ethylene polymer was extracted by the xylene. The properties of the extracted ethylene-acrylic acid polymer were measured and the results are reported in the following Table II, employing the test procedures identified above in connection with the ethylene polymers of Table I:

TABLE II

| Melt index | 9.4 |
|---|---|
| Solution viscosity | 0.555 |
| Tensile strength, p.s.i. | 4891 |
| Elongation, percent | 888 |
| Tensile impact ft. lbs./in.[2] | 281 |
| Haze, percent | 1.1 |
| Visual haze | [1] |

[1] Clear, no bluish haze.

From the data shown in Tables I and II, it is apparent that the laminated glass structure containing the solvent-extracted ethylene-acrylic acid polymer has superior haze characteristics when compared with the laminated glass structure containing the ethylene-acrylic acid thermally cracked polymer product as the inner layer. Additionally, it is to be noted that the strength characteristics of the ethylene-acrylic acid polymer as measured by the tensile strength, tensile impact and elongation are not significantly reduced by the solvent extraction process. While the tensile strength and tensile impact of the solvent-extracted ethylene-acrylic acid polymer are higher than those of the thermally cracked product, the percent elongation is only slighly less than the elongation of the thermally cracked product.

Example II

A number of polyethylene solvents were employed to solvent-extract the ehtylene-acrylic acid polymer of Table I. Solvents employed, the weight percent of the ethylene-acrylic acid polymer extracted, and the properties of the solvent-extracted ethylene-acrylic acid polymer product are shown below in Table III. The physical test procedures employed were as described in Example I.

A comparison of the characteristics of the polymer products of Table III with the ethylene-acrylic acid polymer of Table I clearly demonstrates the effectiveness of the invention to substantially improve the haze characteristics of the ethylene-acrylic acid polymer by the solvent extraction process. Improved haze is obtained in each case without reduction of the tensile strength properties of the ethylene-acrylic acid polymer.

Table III

| Solvent | Wt. percent of ethylene-acrylic acid polymer extracted | Melt index | Inherent viscosity | Tensile strength, p.s.i. | Elongation, percent | Visual haze |
|---|---|---|---|---|---|---|
| Xylene | 16.8 | 4.0 | .591 | 4,250 | 583 | Clear, no bluish haze. |
| Toluene | 4.1 | 14.8 | .490 | 5,100 | 780 | Do. |
| Carbon tetrachloride | 0.5 | 16.7 | .426 | 5,270 | 792 | Do. |
| Tetrachloroethylene | 9.7 | 18.6 | .565 | 5,100 | 720 | Do. |
| Chlorobenzene | 8.9 | 9.2 | .561 | 5,400 | 751 | Do. |
| O-dichlorobenzene | 9.5 | 18.0 | .431 | 4,500 | 711 | Do. |

Although the invention has been described with reference to specific materials, embodiments and details, various modifications and changes, within the scope of the invention, will be apparent to those skilled in the art and are contemplated to be embraced in the invention.

What is claimed is:

1. A process for improving the optical properties of an ethylene-carboxylic acid polymer which comprises contacting a solid preformed ethylene-carboxylic acid polymer with an excess, on a weight basis, of a liquid organic solvent at a temperature of at least 50° C. for a period of time sufficient to dissolve at least a portion of the ethylene-carboxylic acid polymer; said ethylene-carboxylic acid polymer being a copolymer of ethylene and acrylic or methacrylic acid, said copolymer containing 10 to 50 weight percent acrylic or methacrylic acid and the balance substantially ethylene; said liquid organic solvent being a solvent which, at the contacting temperature, will completely dissolve polyethylene, but which will dissolve not more than 30 weight percent of the ethylene-carboxylic acid polymer and which is selected from the group consisting of benzene, toluene, xylene, ethyl benzene, carbon tetrachloride, tetrachloroethylene, chlorobenzene, and O-dichlorobenzene.

2. The process of claim 1 wherein said ethylene-carboxylic acid polymer is an ethylene-acrylic acid copolymer.

3. The process of claim 1 wherein the contacting step is conducted at a temperature of at least 80° C.

4. The process of claim 3 wherein the ratio of polyethylene solvent to the ethylene-carboxylic acid polymer employed in the contacting step is at least 10 to 1 on a weight basis.

5. The process of claim 4 wherein contact between the polyethylene solvent and the ethylene-carboxylic acid polymers is maintained at the elevated temperature for a period of at least two minutes.

References Cited

UNITED STATES PATENTS 3,272,771   9/1966   Busche et al. _____ 260—88.1 R
3,520,861   7/1970   Thomson et al. ____ 260—88.1 R HARRY WONG, JR., Primary Examiner U.S. Cl. X.R.

117—124, 132, 140, 142, 148, 155; 161—203; 260—33.6 UA, 33.8 UA, 78.5 T, 80.73, 80.8, 86.7